United States Patent
Wagner et al.

(10) Patent No.: US 11,176,299 B1
(45) Date of Patent: Nov. 16, 2021

(54) ANALYSIS OF SIGNAL TRANSITIONS IN FEEDBACK CIRCUITS

(71) Applicant: International Business Machines Corporation, Armonk, NY (US)

(72) Inventors: Israel A. Wagner, Zichron Yaakov (IL); Noam Jungmann, Holon (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/929,235

(22) Filed: Jul. 15, 2020

(51) Int. Cl.
| | |
|---|---|
| *G06F 30/3312* | (2020.01) |
| *G06F 30/333* | (2020.01) |
| *G06F 30/398* | (2020.01) |
| *G06F 30/327* | (2020.01) |
| *G06F 119/12* | (2020.01) |

(52) U.S. Cl.
CPC ........ *G06F 30/3312* (2020.01); *G06F 30/327* (2020.01); *G06F 30/333* (2020.01); *G06F 30/398* (2020.01); *G06F 2119/12* (2020.01)

(58) Field of Classification Search
CPC .. G06F 30/3312; G06F 30/398; G06F 30/333; G06F 30/327; G06F 2119/12; G06F 119/12
See application file for complete search history.

(56) References Cited

U.S. PATENT DOCUMENTS

| | | | |
|---|---|---|---|
| 5,508,937 A | 4/1996 | Abato | |
| 6,346,838 B1 * | 2/2002 | Hwang | G06F 1/10 327/156 |
| 8,443,328 B2 | 5/2013 | Dartu | |
| 10,338,993 B1 | 7/2019 | Lekivetz | |
| 10,776,547 B1 * | 9/2020 | Gupta | G06F 16/9024 |
| 2007/0220462 A1 * | 9/2007 | Lindberg | G06F 30/3312 716/108 |
| 2016/0156342 A1 | 6/2016 | Yun | |
| 2016/0292332 A1 * | 10/2016 | Mishra | G06F 30/3312 |
| 2018/0137225 A1 * | 5/2018 | Joo | G06F 30/367 |
| 2019/0147927 A1 | 5/2019 | Jeon | |
| 2020/0097627 A1 | 3/2020 | Coudert | |

OTHER PUBLICATIONS

Browne et al., "Automatic Circuit Verification Using Temporal Logic: Two New Examples", in Formal Aspects of VLSI Design: Proceedings of the 1985 Edinburgh Workshop on VLSI, Jun. 30-Jul. 2, 1985, 14 pages, Edinburgh, Scotland, UK.

De Cuyper et al., "A digital platform for real-time simulation of power converters with high switching frequency", Proceedings of the 2011 14th European Conference on Power Electronics and Applications, IEEE, 2011, 10 pages.

Rahav, Gil, "STA—Static Timing Analysis", lecture materials for EE Dept BGU, Freescale Semiconductors, Israel, provided on Apr. 19, 2020, 125 pages.

Williams, Brian C., "Qualitative Analysis of MOS Circuits", Technical Report 767, MIT Artificial Intelligence Laboratory, MIT Jul. 1984, 96 pages.

* cited by examiner

*Primary Examiner* — Vuthe Siek
(74) *Attorney, Agent, or Firm* — Monchai Chuaychoo (57) ABSTRACT

An approach for detecting potential failures and sensitivities, based on preliminary verification of timing circuits which includes feedback and combinatorial loops for is disclosed. The approach comprises relating timing events by algebraic equations, breaking loops, and feedbacks by backward reference, and then propagate signals through time and netlist.

20 Claims, 7 Drawing Sheets

ANALYSIS OF SIGNAL TRANSITIONS IN FEEDBACK CIRCUITS

BACKGROUND

This invention relates generally to design of complex circuit networks, and more particularly, to selective, incremental recalculation of a signal value (such as a timing signal) propagated forward or backward through such a network in response to one or more incremental modifications to the complex circuit network under design.

The designing and verifying the logical operation of an electronic/integrated circuit design has been leveraging the use of computer-aided software. Simulation analysis has been utilized for analyzing control signals in an electronic circuit design. High-performance systems (e.g. memory arrays) require highly customized control signals that in many cases involve feedback circuits or closed combinatorial loops (e.g., wordline, precharge, bit-select, sense control, etc.).

SUMMARY

Aspects of the present invention disclose a computer-implemented method, a computer program product and computer system for detecting potential failures of timing circuits. The computer implemented method may be implemented by one or more computer processors and may include deriving, by one or more computer processors, a set of non-looping temporal equations based on data associated with a circuit design; applying, by the one or more computer processors, the set of temporal equations to the circuit design; determining, by the one or more computer processors, one or more net lists of gate timing values associated with the circuit design; validating, by the one or more computer processors, the one or more net lists of gate timing values associated with the circuit design; and outputting, by the one or more computer processors, a status of circuit design based on the validating.

In an embodiment, the computer program product may include one or more computer readable storage media and program instructions stored on the one or more non-transitory computer readable storage media, the program instructions comprising: program instructions to derive a set of non-looping temporal equations based on data associated with a circuit design; program instructions to apply the set of temporal equations to the circuit design; program instructions to determine one or more net lists of gate timing values associated with the circuit design; program instructions to validate the one or more net lists of gate timing values associated with the circuit design; and program instructions to output a status of circuit design based on the validating.

In another embodiment, the computer program product may include one or more non-transitory computer readable storage media and program instructions stored on the one or more non-transitory computer readable storage media, the program instructions comprising: program instructions to derive a set of non-looping temporal equations based on data associated with a circuit design; program instructions to apply the set of temporal equations to the circuit design; program instructions to determine one or more net lists of gate timing values associated with the circuit design; program instructions to validate the one or more net lists of gate timing values associated with the circuit design; and program instructions to output a status of circuit design based on the validating.

BRIEF DESCRIPTION OF THE DRAWINGS

Preferred embodiments of the present invention will now be described, by way of example only, with reference to the following drawings, in which.

DETAILED DESCRIPTION

Current methods for designing control signals in high performance systems (e.g., memory arrays) require customization that involves feedback circuits and/or closed combinatorial loops (e.g., wordline, precharge, bit-select, sense control, etc.). There are several approaches to the customization: i) derive several different edges form a single edge, ii) allow the edges to control one another by way of gating and/or triggering, and iii) use feedback circuits of various sorts to store/save states. However, verifying such designs can be difficult. If using a circuit simulation software (e.g., Spice/Spectre, etc.) to verify, then the result can be precise but at the sacrifice of only using a single point in feasibility design space. If using static timing analyzers (e.g., TLT, etc.) methodology then it can be difficult since the methodology has certain challenges: i) requires a complete description of the array under test and ii) limited or none ability in handling feedback/memory circuits.

Figure 1:
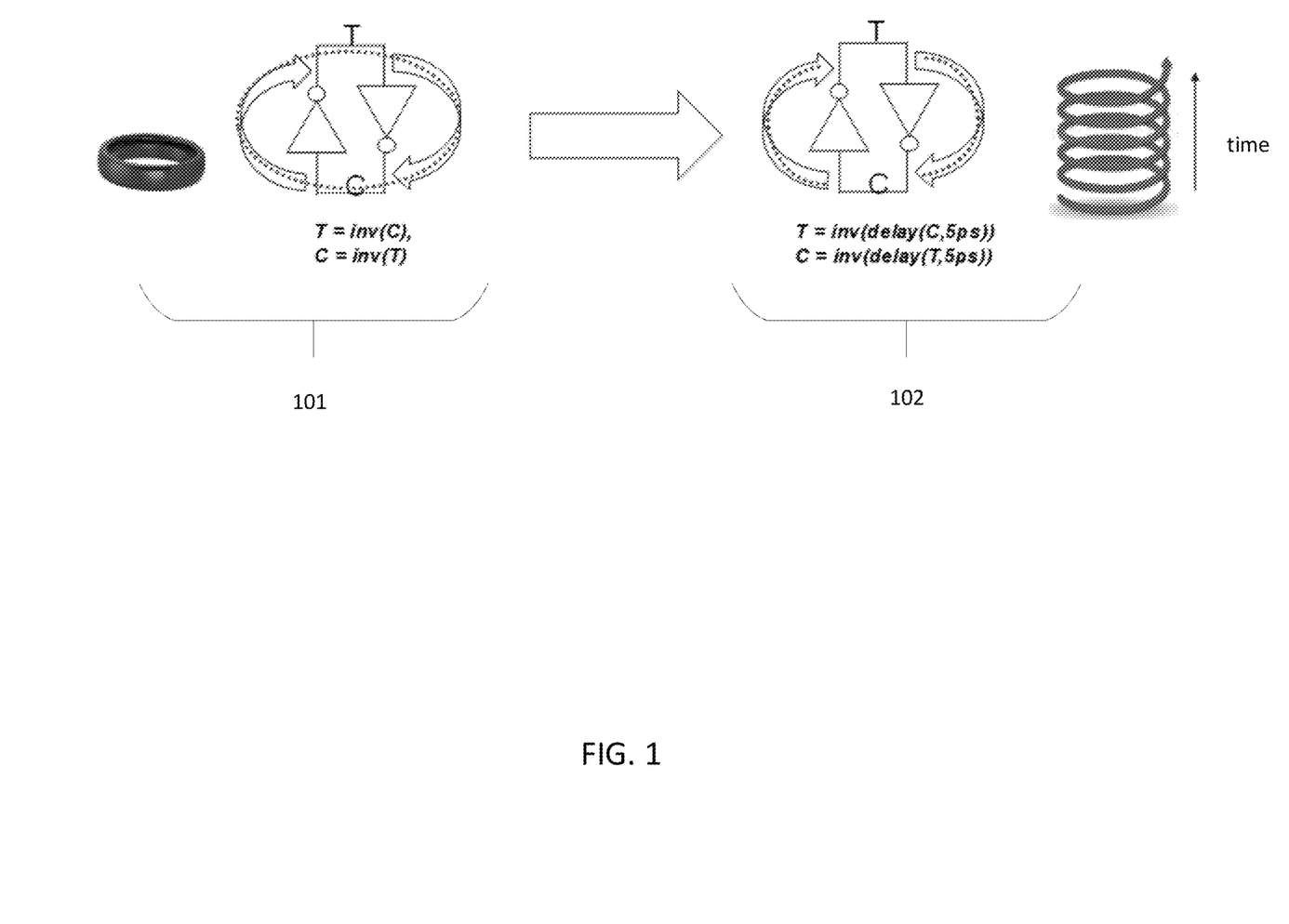
FIG. 1 is a functional block diagram illustrating how loops are untied in the proposed method.

Embodiments of the present invention recognize current drawbacks with the verification methodology and provides an approach for a preliminary verification of timing circuits including feedback and combinatorial loops, to help monitoring races and detect potential failures/sensitivities in loop-based circuits (see FIG. 1). The approach can be used both in the early, pre-circuit phase of the design and in the later phase of a completed design. The approach uses the following steps: i) relate timing events by algebraic equations, ii) break loops and feedbacks by backward reference, and then iii) propagate signals through time and netlist (i.e., description of connectivity of an electronic circuit) and iv) verify the correctness of results by applying a set of checking-rules.

Current embodiment has the following advantages: i) combined representation of logic and time allows for feedback/loop-based circuits to be analyzed and ii) applicable in either, early stages of the design process or later phase of the complete design.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1 illustrates the concept of approach of an embodiment of the present invention. Some circuits (i.e., circuit one 101) use loops to produce feedback and can achieve memory effects. If using a static timing method, then the verification does not work. If using a simulation method, then it only provides a partial solution and only address a single point in design space. By breaking up the loop (i.e., circuit one 101) and applying spiral equations (i.e., non-loop time-relative equations, referring to a node to previous time points of the circuit), the embodiment of the present invention is able to overcome the difficulty of verification and design of the circuit (i.e., circuit two 102).

Figure 2:
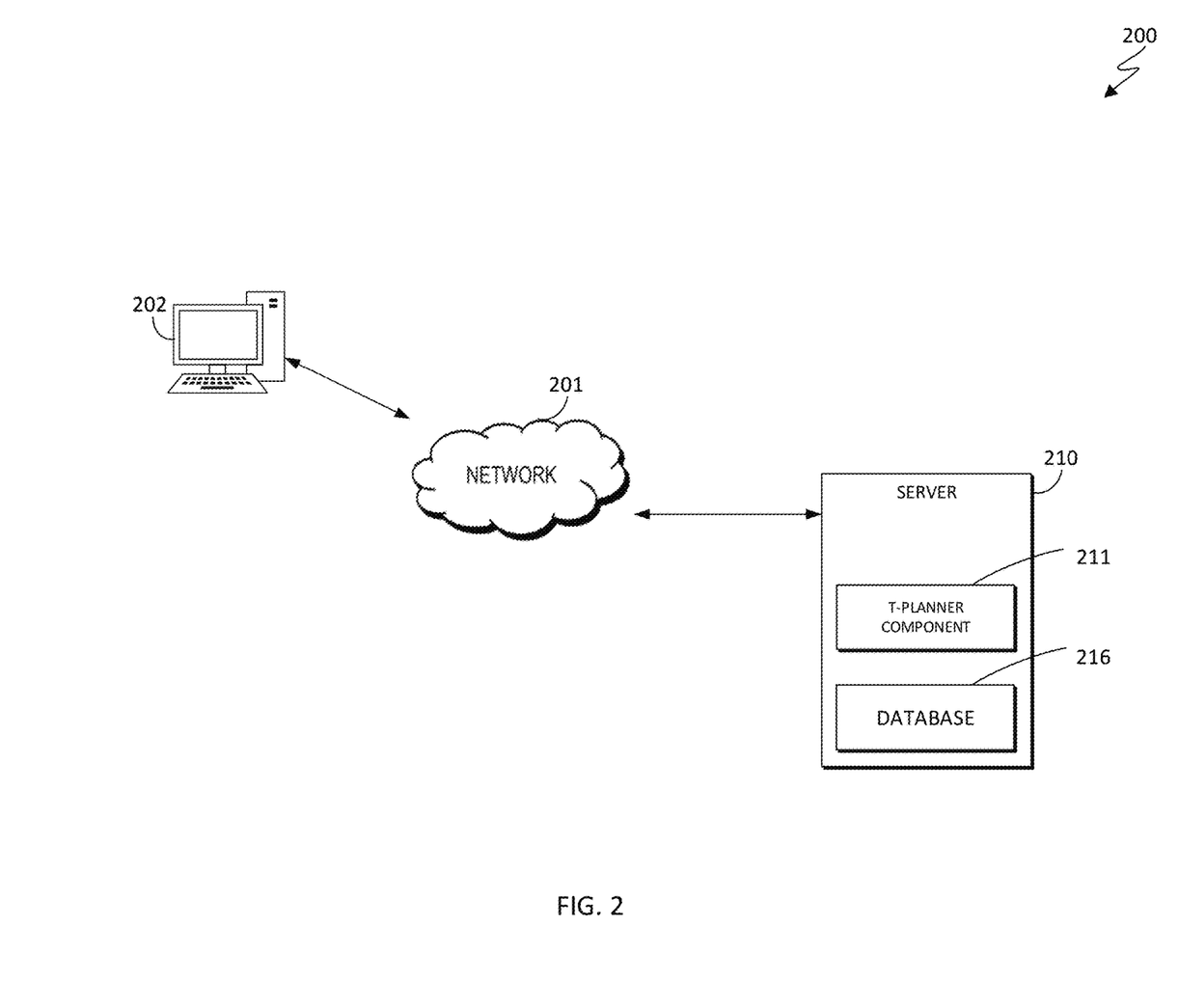
FIG. 2 is a functional block diagram illustrating a t-planner environment, designated as 200, in accordance with an embodiment of the present invention.

FIG. 2 is a functional block diagram illustrating a t-planner environment, designated as 200, in accordance with an embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

T-planner environment 200 includes network 201, client computing device 202 and server 210.

Network 201 can be, for example, a telecommunications network, a local area network (LAN), a wide area network (WAN), such as the Internet, or a combination of the three, and can include wired, wireless, or fiber optic connections. Network 201 can include one or more wired and/or wireless networks that are capable of receiving and transmitting data, voice, and/or video signals, including multimedia signals that include voice, data, and video information. In general, network 201 can be any combination of connections and protocols that can support communications between server 210, client computing device 202 and other computing devices (not shown) within t-planner environment 200. It is noted that other computing devices can include, but is not limited to, client computing device 202 and any electromechanical devices capable of carrying out a series of computing instructions.

Server 210 and client computing device 202 can be a standalone computing device, a management server, a web server, a mobile computing device, or any other electronic device or computing system capable of receiving, sending, and processing data. In other embodiments, server 210 and client computing device 202 can represent a server computing system utilizing multiple computers as a server system, such as in a cloud computing environment. In another embodiment, server 210 and client computing device 202 can be a laptop computer, a tablet computer, a netbook computer, a personal computer (PC), a desktop computer, a personal digital assistant (PDA), a smart phone, or any other programmable electronic device capable of communicating other computing devices (not shown) within t-planner environment 200 via network 201. In another embodiment, server 210 and client computing device 202 represents a computing system utilizing clustered computers and components (e.g., database server computers, application server computers, etc.) that act as a single pool of seamless resources when accessed within t-planner environment 200.

Client computing device 202 can be a computing device loaded with software and tools for used to design, build, and test integrated circuits. Client computing device 202 can include interfaces to semiconductor fabrication machine.

Embodiment of the present invention can reside on server 210. Server 210 includes t-planner component 211 and database 216.

T-planner component 211 provides the capability of preliminary verification of timing circuits, including feedback and combinatorial loops, to help monitor races and detect potential failures/sensitivities.

Database 216 is a repository for data used by t-planner component 211. Database 216 can be implemented with any type of storage device capable of storing data and configuration files that can be accessed and utilized by server 210, such as a database server, a hard disk drive, or a flash memory. Database 216 uses one or more of a plurality of techniques known in the art to store a plurality of information. In the depicted embodiment, database 216 resides on server 210. In another embodiment, database 216 may reside elsewhere within t-planner environment 200, provided that t-planner component 211 has access to database 216. Database 216 may store information associated with, but is not limited to, temporal equations, netlist of circuits, validation rules, implication rules, formal rules, and data related to circuit design.

Figure 3:
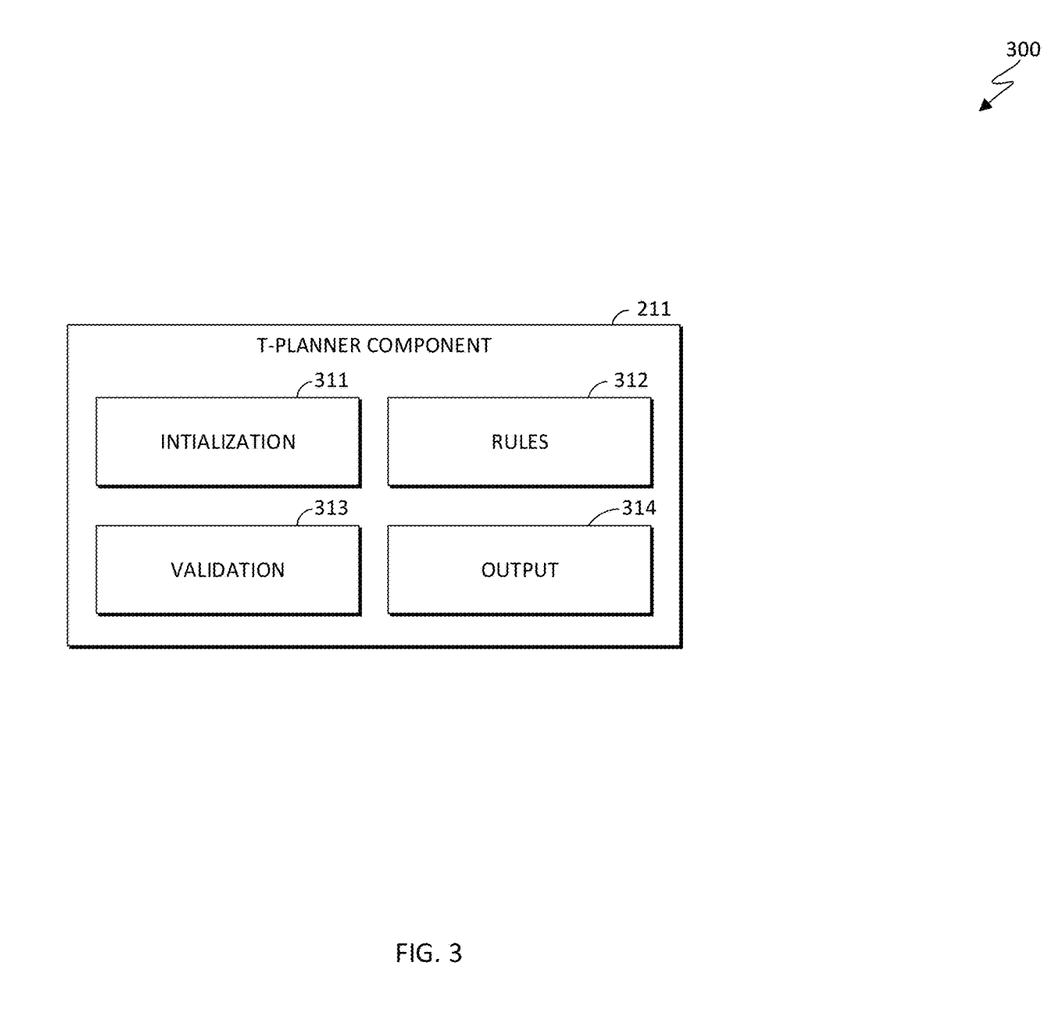
FIG. 3 is a functional block diagram illustrating t-planner component 211, designated as 300, in accordance with an embodiment of the present invention.

FIG. 3 is a functional block diagram illustrating t-planner component 211 in accordance with an embodiment of the present invention. In the depicted embodiment, t-planner component 211 includes initialization component 311, rules component 312, validation component 313 and output component 314.

As is further described herein below, initialization component 311 of the present invention provides the capability of defining and setting parameters, rules (e.g., user defined, implication, checking, formal, etc.), equations, and circuit related design data as it relates to the pre-circuit design (or any stages of the circuit design process). Parameters can include, but is not limited to, value of each nets from the netlist of the circuit and initial conditions (i.e., time<0) of the circuit. Circuit related design data can include a netlist (NL) of the circuit, based on elementary logical functions (e.g., NOT, NAND, NOR, XOR, PASSGATE, etc.). Equations includes temporal equations and delay equations. Delay equations can include a table of delay equations for each elementary function, specifying its input-output delays. For example, for a 2-way NAND without net (i.e., "wires" that connect things together in a circuit) Out and input nets InA, InB, with input to output delays 8 ps and 10 ps (i.e., Out(t)=nand(inA(t−8 ps), InB(t−10 ps))). The user defined rules includes a set of checking rules (i.e., check for each net/signal in the circuit), implication rules, initial conditions (i.e., circuit value for time t<0) and misc. user defined rules tailored for each design/fabrication location. For example, checking rules can be, no pulse can be shorter than MIN_PULSE (i.e., a pulse should not have more than a single state change within a given period). Implication rule are rules used to derive a complete definition of each edge along the time, based on the given input edges (e.g., GCLK, DATA_IN, etc.).

As is further described herein below, rules component 312 of the present invention provides the capability of applying rules and/or values on a circuit. Additionally, rules component 213 is capable of deriving STE (set of temporal equations). Deriving STE primary consists of establishing a set of temporal equations based on the given circuit. The STE describes the dependencies between edges (rising/falling) of signals in a given circuit. Circuits are typically made of basic gates (e.g., Inverter, NOR, NAND, XOR, latch, etc.) and a corresponding set of known temporal equations. For example: an inverter may have (attached to it), the equation: inv_out(t+d)=not(inv_in(t)), where t=time and d=delay of the inverter. Then, each time an inverter is instantiated in the netlist (NL), an application of the equation inv_out(t+d)=not(inv_in(t)), is added. However, the names, "inv_in" and "inv_out" are replaced with proper nets (i.e., signal names) form the netlist. In another example, after obtaining a net list of the sample circuit, rules component 213 would list all the gates relating to the sample circuit and created the temporal equations based on all the gates. Rules component 213 can replace the name of the signal associated with the gate with a gate function proper net names.

After deriving a full set of STE, rules component 312, can systematically, apply one or two rules (based on the STE) on the circuit until all or some net values achieve the desire net duration and/or threshold (based on the goal of the user). For example, for each primary input of the circuit, add an equation to STE defining its temporal behavior:

For a pulse IN2 with width 5 and period 10 add this:
IN2(t)={"1" if (0<(t % 10)<5), "0" otherwise}

Rules component 312, for each net in the netlist, would define its initial condition (i.e., its value for time t<0). Furthermore, rules component 312 would iteratively apply the STE until all nets in the NL have values for the desired duration. It is noted that desired net threshold is a threshold that is selectable and adjustable by the user.

As is further described herein below, validation component 313 of the present invention provides the capability of checking the resulting temporal edges (e.g., GCLK, DATA_IN, etc.) by applying validation methods. Validation methods includes i) check visually of the resulting waveforms and ii) applying a set of formal rules to check the edges (e.g., Tfall-Trise>MinPulseWidth, Trise(SENSE) >Trise(WL)+MinDelta, etc.).

As is further described herein below, output component 314 of the present invention provides the capability of corresponding/interact with users (through a dialogue box or prompts) based on certain steps in the sequence. For example, if using a visual validation method then output component 314 can request the user to validate the waveform of the circuit. In another example, if the entire step of checking has been completed then output component 314 can request the user to approve the design and output component 314 can send the design to be manufacture via client computing device 202. Otherwise, if the design has been rejected then the user can be prompted to check another design.

Figure 4:
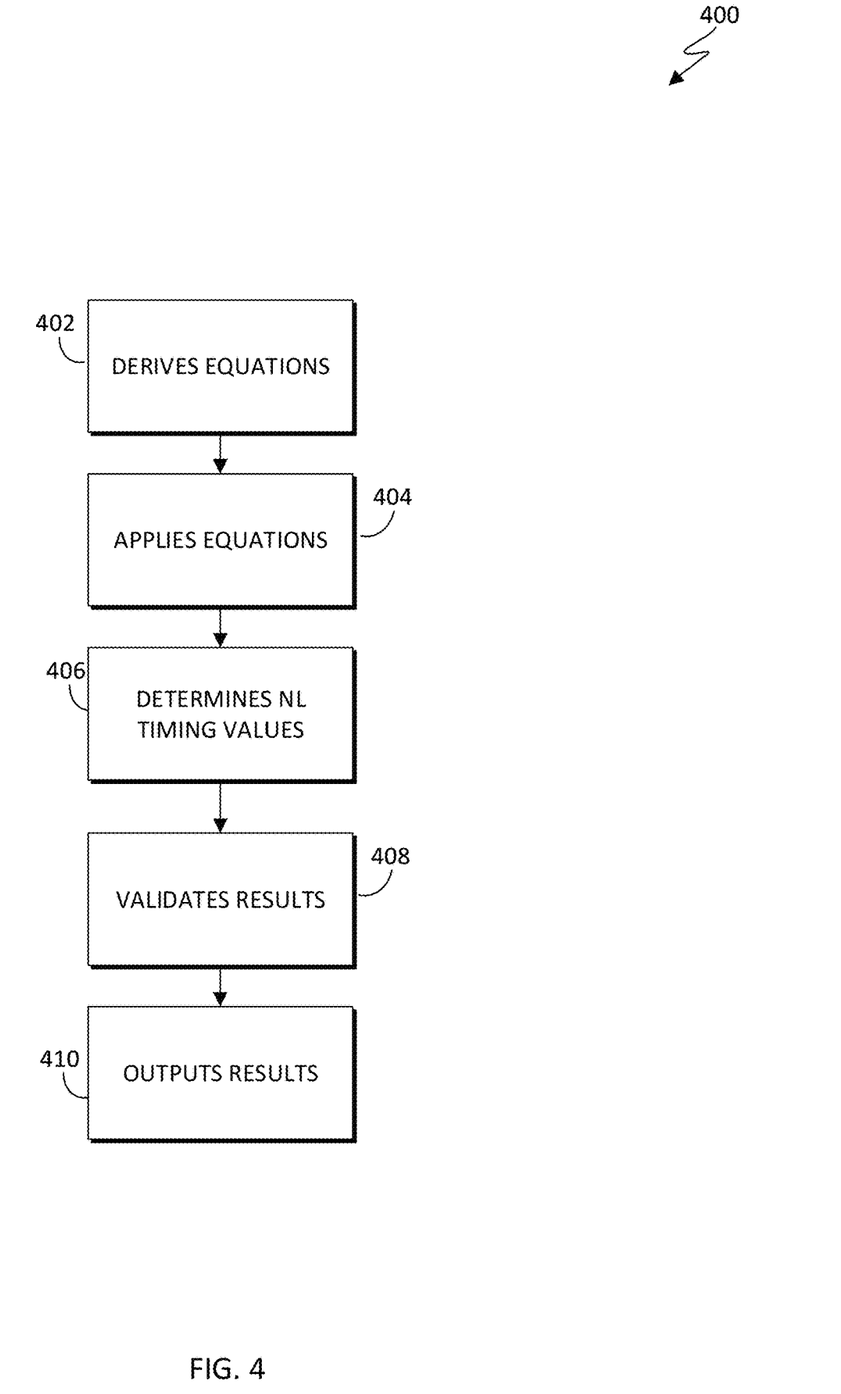
FIG. 4 is a high-level flowchart illustrating the operation of server 210, designated as 400, in accordance with an embodiment of the present invention.

FIG. 4 is a flowchart illustrating the operation of t-planner component 211, designated as 400, in accordance with another embodiment of the present invention.

T-planner component 211 derives equations (step 402). In an embodiment, t-planner component 211, through initialization component 311, receives data. The data includes, but it is not limited to, a netlist, gate timing data, parameters, rules, equations, and circuit related design data. Furthermore, t-planner component 211, derives a set of temporary equations relating the edges of the signals under test, breaking feedback/loops by introducing the time aspect to be used for circuit design.

For example, t-planner component 211 can set STE (the set of temporal equations) to be empty and use a rule below:
For each output Y of gate G do:
STE=STE U {the delay equation d(F) from the table DT according to the function ƒ(G), applied to the input nets of gate G}

T-planner component 211 apply equations (step 404). In an embodiment, t-planner component 211, through rule component 212, applies a set of rules to derive a complete definition of each edge along the time, based on the given input edges (e.g. GCLK, DATA_IN, etc.). For example, for each primary input of the circuit, t-planner component 211 add an equation to STE, defining its temporal behavior. The rule can be summarized below:

For a pulse IN2 with width 5 and period 10 add this:
IN2(t)={"1" if (0<(t % 10)<5), "0" otherwise}

T-planner component 211 determine NL (netlist) values (step 406). In an embodiment, t-planner component 211, determines the NL values and compare against the desired value. For example, for each net in the netlist NL, define its initial condition (i.e. its value for time t<0). Iteratively, t-planner component 211 applies the equations in STE until all nets in NL have values for the desired duration (i.e., parameter set by the user before the start of the circuit analysis).

T-planner component 211 validate results (step 408). In an embodiment, t-planner component 211, validate the result using either a visual check or a formal check. A visual check involves producing a visual "waveform"-like representation of the signals and review it by a user. A formal check uses a set of formal rules to check the edges:

Tfall-Trise>MinPulseWidth,
Trise(SENSE)>Trise(WL)+MinDelta

T-planner component 211 output results (step 410). In an embodiment, t-planner component 211, output the results to a user. The output can be a screen of the circuit design to a user or the output can be a notification to the user that the design check has completed. For example, if a design passes the validation check then the design can be sent to be manufactured (via client computing device 202). However, if the result show that the design failed then t-planner component 211 can notify users of the failure.

Figure 5A:
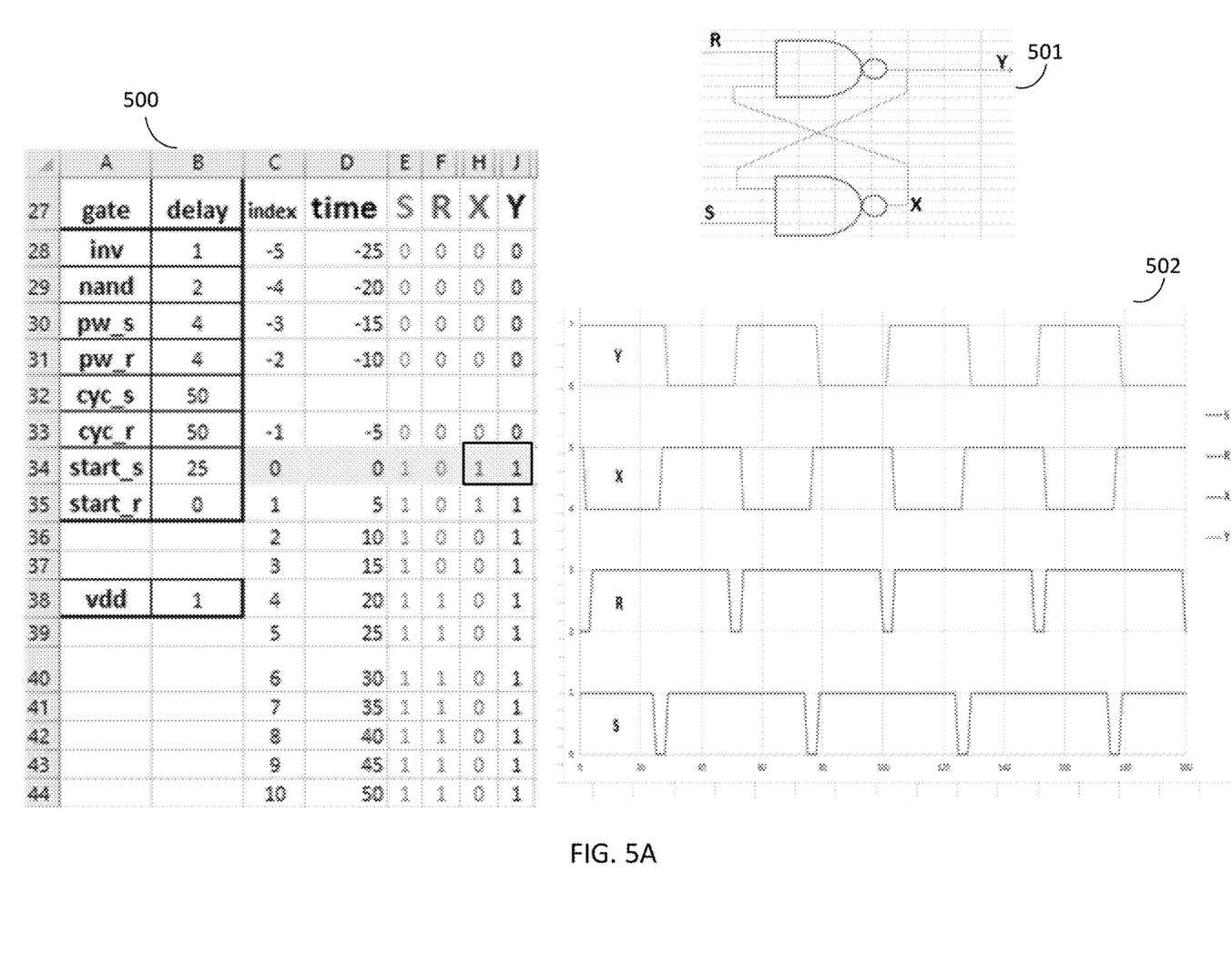
FIG. 5A is a diagram illustrating the application of the method, as outlined in FIG. 4, on an S-R latch, in accordance with an embodiment of the present invention.

FIG. 5A is a diagram illustrating the application of the method, as outlined in FIG. 4, on an S-R latch (i.e., latch 501), in accordance with an embodiment of the present invention. An IC simulation software is used to illustrate the loop-based circuit (i.e., SR_latch_sim 502) and a spreadsheet (i.e., spreadsheet_one 500) is used to illustrate the pseudo simulation. SR_latch_sim 502 represents waveform output for the S-R latch at each respective point, S, R, X and Y. The value of cell, J34, presents the result of the values from cell F31 and J31. Each signal in a column of the spreadsheet relates to other columns by a formula. The plan logic is Y=nand(R,X); X=nand(S, Y), which contains a loop. The temporal logic is Y=delay(nand(R,X),D); X=delay (nand(S,Y),D), which does not contain a loop. The cell, H34 and J34, contains a formula can be defined, respectively, as below:

J34=$B$38*not(and(CELL (ROW( )−$B$29, 6), CELL (ROW( )−$B$29, 7))

H34=$B$38*not(and(CELL (ROW( )−$B$29, 5), CELL (ROW( )−$B$29, 8))

The value of cell, B29, is 2 which currently indicates that there are no issues with the circuit.

Figure 5B:
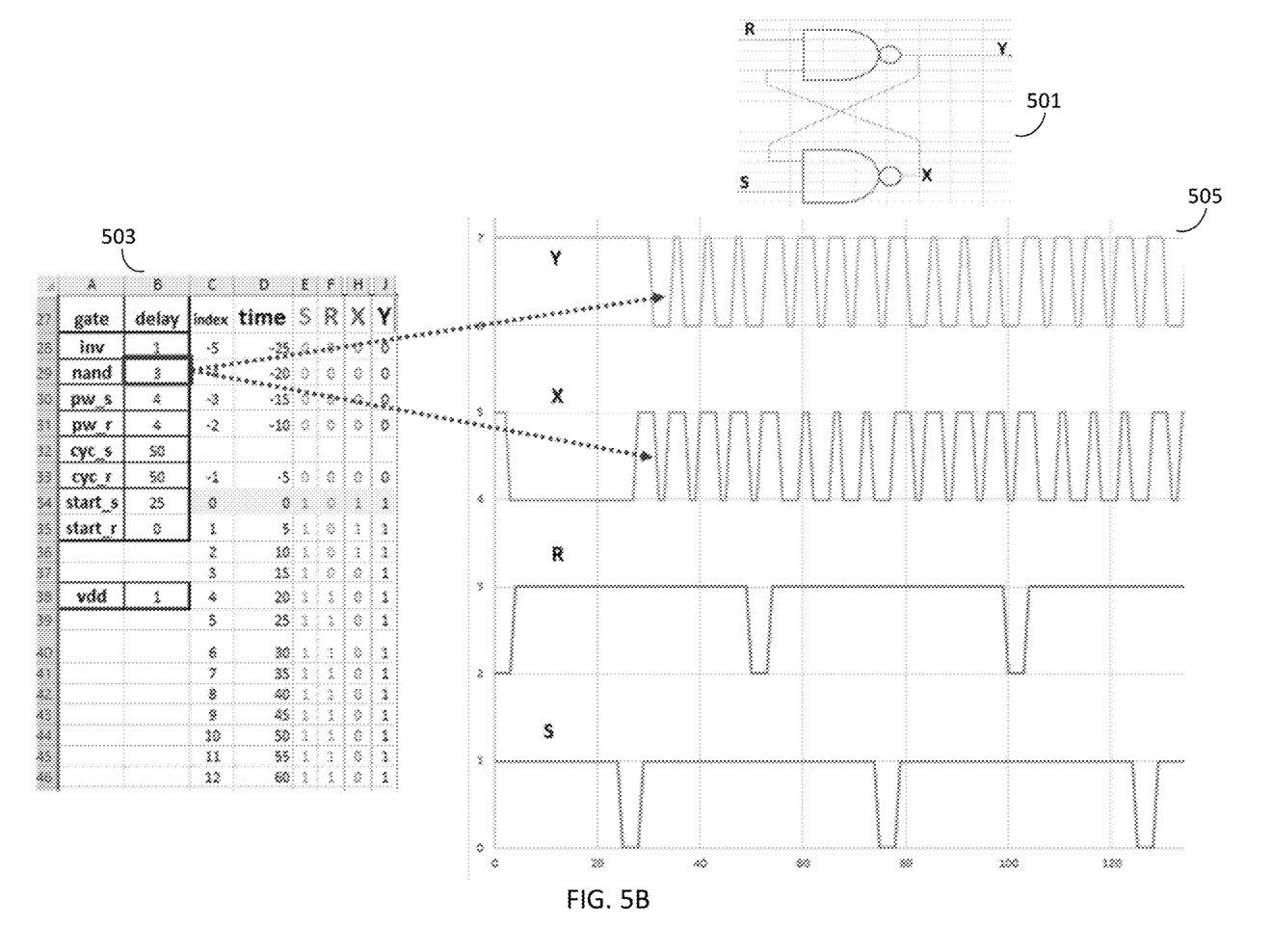
FIG. 5B is a continuation of FIG. 5A, illustrating how the t-planner detects the failure of the S-R latch, in accordance with an embodiment of the present invention.

FIG. 5B is a continuation of FIG. 5A, illustrating the failure of the S-R latch, in accordance with an embodiment of the present invention. Applying validation rules (either visual check or rule check) on the circuit, there is a failure indicated by the cell, B29. Using a visual check, a user can view the output waveforms for X and Y (i.e. SR_latch_sim_fail 505) and able to visually determine that there is a failure in the circuit. Using a rule check to validate, the value of cell, B29 (delay value), increased from the value of 2 (from FIG. 5A) to the value of 3. Thus, the NAND delay increased from 2 to 3 which indicates a glitch and/or failure. The formula for Y and X of the current spreadsheet (i.e., spreadsheet_one_failure 503) can be defined below:

Y=VDD*nand(delay(R,nand_delay), delay(X,nand_delay));

EXCEL: J34=$B$38*not(and(CELL (ROW( )-$B$29, 6), CELL (ROW( )-$B$29, 7))

X=VDD*nand(delay(S,nand_delay), delay(Y,nand_delay));

EXCEL: H34=$B$38*not(and(CELL (ROW( )-$B$29, 5), CELL (ROW( )-$B$29, 8))

Figure 6:
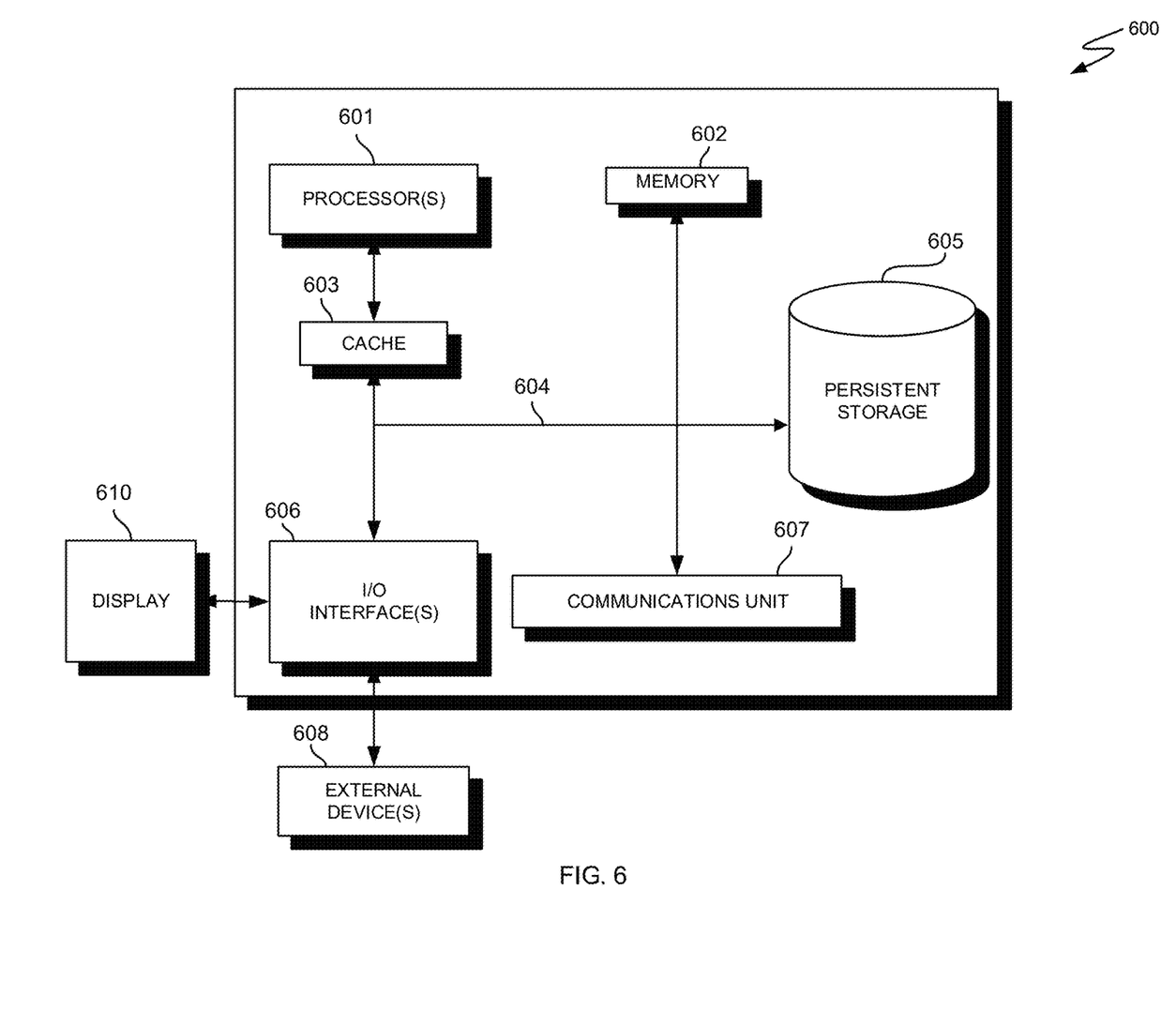
FIG. 6 depicts a block diagram, designated as 600, of components of a server computer capable of executing the t-planner component 211 within the s t-planner environment, of FIG. 2, in accordance with an embodiment of the present invention.

FIG. 6, designated as 600, depicts a block diagram of components of t-planner component 211 application, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

FIG. 6 includes processor(s) 601, cache 603, memory 602, persistent storage 605, communications unit 607, input/output (I/O) interface(s) 606, and communications fabric 604. Communications fabric 604 provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of processor(s) 601 by holding recently accessed data, and data near recently accessed data, from memory 602.

Program instructions and data (e.g., software and data) used to practice embodiments of the present invention may be stored in persistent storage 605 and in memory 602 for execution by one or more of the respective processor(s) 601 via cache 603. In an embodiment, persistent storage 605 includes a magnetic hard disk drive. Alternatively, or in addition to a magnetic hard disk drive, persistent storage 605 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605. T-planner component 211 can be stored in persistent storage 605 for access and/or execution by one or more of the respective processor(s) 601 via cache 603.

Communications unit 607, in these examples, provides for communications with other data processing systems or devices. In these examples, communications unit 607 includes one or more network interface cards. Communications unit 607 may provide communications through the use of either or both physical and wireless communications links. Program instructions and data (e.g., t-planner component 211) used to practice embodiments of the present invention may be downloaded to persistent storage 605 through communications unit 607.

I/O interface(s) 606 allows for input and output of data with other devices that may be connected to each computer system. For example, I/O interface(s) 606 may provide a connection to external device(s) 608, such as a keyboard, a keypad, a touch screen, and/or some other suitable input device. External device(s) 608 can also include portable computer readable storage media, such as, for example, thumb drives, portable optical or magnetic disks, and memory cards. Program instructions and data (e.g., t-planner component 211) used to practice embodiments of the present invention can be stored on such portable computer readable storage media and can be loaded onto persistent storage 605 via I/O interface(s) 606. I/O interface(s) 606 also connect to display 610.

Display 610 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for detecting potential failures of timing circuits, the computer-implemented method comprising:
   deriving, by one or more computer processors, a set of non-looping temporal equations based on data associated with a circuit design;
   applying, by the one or more computer processors, the set of temporal equations to the circuit design, wherein applying further comprises:
      adding an equation to the set of non-looping temporal equations for each primary input of the circuit design to define a temporal behavior;
   determining, by the one or more computer processors, one or more net lists of gate timing values associated with the circuit design, wherein determining further comprises:
      defining, by the one or more computer processors, an initial condition for each net of the one or more net lists, wherein the initial condition is a value of the each net at a given time frame; and iteratively, applying, by the one or more computer processors, each equation from the set of non-looping temporal equations to all the nets of the circuit design until the net value meets a desired net threshold;

validating, by the one or more computer processors, each net of the one or more net lists of gate timing values associated with the circuit design based on a visual check performed by a user, wherein the user compares a typical waveform associated with an initial net of the one or more net list of gate timing values to a current waveform of the initial net; and outputting, by the one or more computer processors, a status of circuit design based on a result of the validation.

2. The computer-implemented method of claim 1, wherein a first data further comprises a net list, rules and gate timing data.

3. The computer-implemented method of claim 1, wherein validating the one or more net list of gate timing values associated with the circuit further comprises a validation rule check.

4. The computer-implemented method of claim 1, wherein outputting the validated circuit further comprises:
notifying, by the one or more computer processors, a user with a result, wherein the result is a pass, or a failure status associated with the circuit; and
sending, by the one or more computer processors, the circuit design to a client device for manufacturing.

5. The computer-implemented method of claim 1, wherein deriving the set of temporal equations further comprises:
listing, by the one or more computer processors, one or more gates based on all nets of the circuit;
creating, by the one or more computer processors, one or more equations based on the one or more gates; and
replacing, by the one or more computer processors, one or more signal names of the one or more equations with one or more gate function based on the corresponding to the one or more gates.

6. The computer-implemented method of claim 2, wherein the rules further comprises a checking rule, validation rule and formal rule.

7. The computer-implemented method of claim 1, wherein applying the set of temporal equations further comprises:
determining, by the one or more computer processors, a net value of all the nets from the temporal equations; and
iteratively, applying, by the one or more computer processors, the temporal equations on all the nets of the circuit until the net value meets a desired net threshold.

8. The computer program product for detecting potential failures of timing circuits, the computer program product comprising:
one or more computer readable storage devices and program instructions stored on the one or more computer readable storage devices, the stored program instructions comprising:
program instructions to derive a set of non-looping temporal equations based on data associated with a circuit design;
program instructions to apply the set of temporal equations to the circuit design, wherein applying further comprises:

adding an equation to the set of non-looping temporal equations for each primary input of the circuit design to define a temporal behavior;

program instructions to determine one or more net lists of gate timing values associated with the circuit design, wherein determining further comprises:
defining, by the one or more computer processors, an initial condition for each net of the one or more net lists, wherein the initial condition is a value of the each net at a given time frame; and
iteratively, applying, by the one or more computer processors, each equation from the set of non-looping temporal equations to all the nets of the circuit design until the net value meets a desired net threshold;

program instructions to validate each net of the one or more net lists of gate timing values associated with the circuit design based on a visual check performed by a user, wherein the user compares a typical waveform associated with an initial net of the one or more net list of gate timing values to a current waveform of the initial net; and program instructions to output a status of circuit design based on a result of the validation.

9. The computer program product of claim 8, wherein the first data further comprises a net list, rules and gate timing data.

10. The computer program product of claim 8, wherein program instructions to validate the one or more net list of gate timing values associated with the circuit further comprises a validation rule check.

11. The computer program product of claim 8, wherein program instructions to output the validated circuit further comprises:
program instructions to notify a user with a result, wherein the result is a pass, or a failure status associated with the circuit; and
program instructions to send the circuit design to a client device for manufacturing.

12. The computer program product of claim 8, wherein program instructions to derive the set of temporal equations further comprises:
program instructions to list one or more gates based on all nets of the circuit;
program instructions to create one or more equations based on the one or more gates; and
program instructions to replace one or more signal names of the one or more equations with one or more gate function based on the corresponding to the one or more gates.

13. The computer program product of claim 9, wherein the rules further comprises a checking rule, validation rule and formal rule.

14. The computer program product of claim 8, wherein program instructions to apply the set of temporal equations further comprises:
program instructions to determine a net value of all the nets from the temporal equations; and
iteratively, program instructions to apply the temporal equations on all the nets of the circuit until the net value meets a desired net threshold.

15. A computer system for detecting potential failures of timing circuits, the computer system comprising:
one or more computer processors;
one or more computer readable storage devices; and
program instructions stored on the one or more computer readable storage devices for execution by at least one of the one or more computer processors, the stored program instructions comprising:

program instructions to derive a set of non-looping temporal equations based on data associated with a circuit design;

program instructions to apply the set of temporal equations to the circuit design, wherein applying further comprises:

adding an equation to the set of non-looping temporal equations for each primary input of the circuit design to define a temporal behavior;

program instructions to determine one or more net lists of gate timing values associated with the circuit design, wherein determining further comprises:

defining, by the one or more computer processors, an initial condition for each net of the one or more net lists, wherein the initial condition is a value of the each net at a given time frame; and iteratively, applying, by the one or more computer processors, each equation from the set of non-looping temporal equations to all the nets of the circuit design until the net value meets a desired net threshold;

program instructions to validate each net of the one or more net lists of gate timing values associated with the circuit design based on a visual check performed by a user, wherein the user compares a typical waveform associated with an initial net of the one or more net list of gate timing values to a current waveform of the initial net; and program instructions to output a status of circuit design based on a result of the validation.

16. The computer system of claim 15, wherein the first data further comprises a net list, rules and gate timing data.

17. The computer system of claim 15, wherein program instructions to validate the one or more net list of gate timing values associated with the circuit further comprises a validation rule check.

18. The computer system of claim 15, wherein program instructions to output the validated circuit further comprises:

program instructions to notify a user with a result, wherein the result is a pass, or a failure status associated with the circuit; and program instructions to send the circuit design to a client device for manufacturing.

19. The computer system of claim 15, wherein program instructions to derive the set of temporal equations further comprises:

program instructions to list one or more gates based on all nets of the circuit;

program instructions to create one or more equations based on the one or more gates; and program instructions to replace one or more signal names of the one or more equations with one or more gate function based on the corresponding to the one or more gates.

20. The computer system of claim 15, wherein program instructions to apply the set of temporal equations further comprises:

program instructions to determine a net value of all the nets from the temporal equations; and iteratively, program instructions to apply the temporal equations on all the nets of the circuit until the net value meets a desired net threshold.

\* \* \* \* \*